March 25, 1969

R. H. A. SCHOONOVER 3,434,739

TANDEM TYPE VEHICLE AND STEERING DRIVE AND TORQUE LIMIT
CONTROLS THEREFOR

Filed Aug. 15, 1967

Richard H. A. Schoonover
INVENTOR

BY

Oliver D. Olson

Agent

Richard H. A. Schoonover
INVENTOR
BY Oliver O. Olson
Agent

United States Patent Office 3,434,739
Patented Mar. 25, 1969

3,434,739
TANDEM TYPE VEHICLE AND STEERING DRIVE AND TORQUE LIMIT CONTROLS THEREFOR
Richard H. A. Schoonover, Albany, Oreg., assignor to Katrak Vehicle Company, Albany, Oreg., a corporation of Oregon
Filed Aug. 15, 1967, Ser. No. 665,663
Int. Cl. B62d 53/00; B60d 7/00
U.S. Cl. 280—492                                      3 Claims

ABSTRACT OF THE DISCLOSURE

A pair of vehicles arranged in tandem having driving wheels connected to the same power source on one of the vehicles through universally connected drive shaft sections extending through a hollow coupling which pivotally interconnects the vehicles. A fluid pressure piston-cylinder unit interconnects the vehicles laterally from the hollow coupling for steering the assembly. A pneumatic tired wheel is confined between a pair of laterally spaced arcuate housings secured one to each vehicle laterally from the hollow coupling, for limiting the degree of rotational displacement of one vehicle relative to the other in their longitudinal direction.

BACKGROUND OF THE INVENTION

This invention relates to vehicles of the tandem type, and more particularly to novel torque limiting means for controlling the relative longitudinal rotational displacement of such vehicles.

Torque limiting controls provided heretofore for tandem type vehicles are characterized by being of heavy, bulky and costly construction, difficult and costly to instal and maintain, and incapable of adjustment for varying the degree of resistance to relative longitudinal rotation of the vehicles.

SUMMARY OF THE INVENTION

Broadly, the present invention provides for tandem type vehicles a simplified torque control by which relative longitudinal rotational displacement of the coupled vehicles is limited by a resilient coupling between the vehicles laterally from the pivot connection between the vehicles.

It is the principal object of this invention to provide for tandem type vehicles a torque limit control which is of simplified and therefore economical construction, which is rugged and therefore capable of heavy usage, and which has long service life with minimum maintenance and repair.

The foregoing and other objects and advantages of the present invention will appear from the following detailed description taken in connection with the accompanying drawings of the preferred embodiments.

DESCRIPTION OF THE PREFERRED EMBODIMENTS

Figure 2:
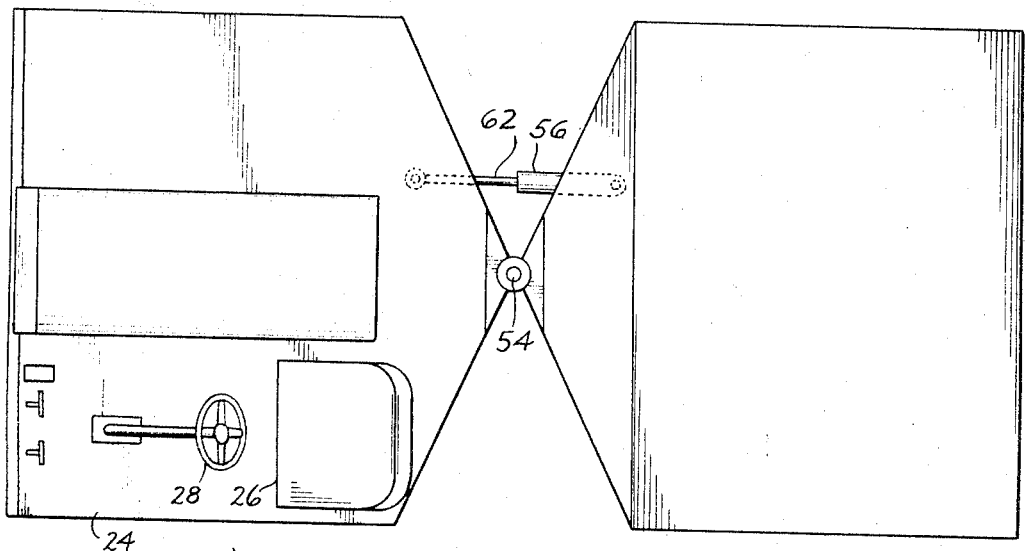
FIG. 2 is a plan view of the vehicle illustrated in FIG. 1.
Figure 1:
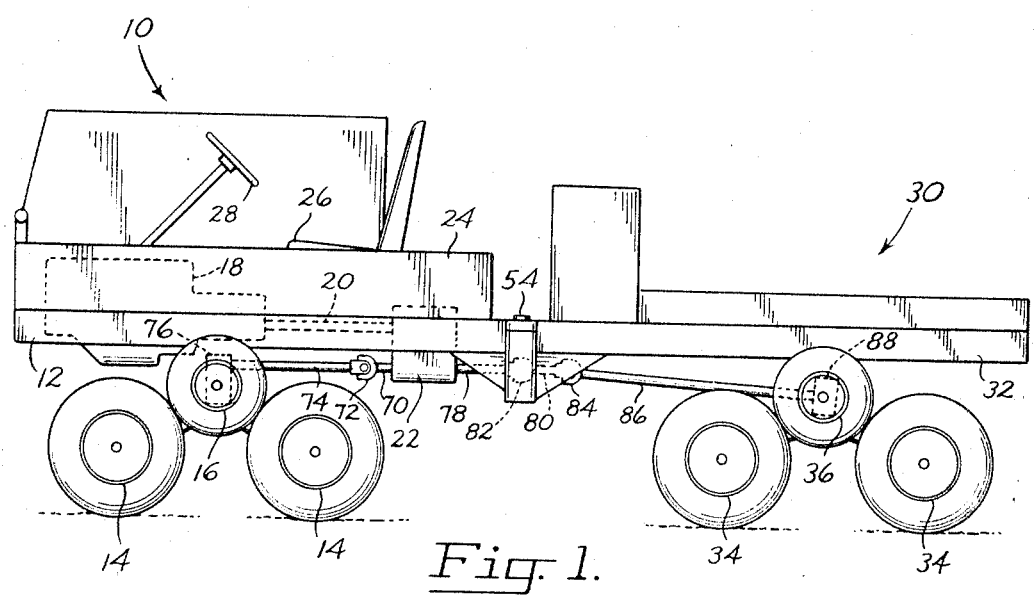
FIG. 1 is a view in side elevation of a tandem type vehicle incorporating therein a torque limiting control embodying the features of the present invention.

In FIGS. 1 and 2 of the drawings there is illustrated a pair of vehicles arranged in tandem. One of the vehicles, for example the forward vehicle 10, includes a frame 12 supported upon laterally spaced pairs of driving wheels 14 which are engaged by the driven wheel 16. The frame supports an internal combustion engine 18 or other suitable source of rotary power, the output shaft 20 of which is connected to conventional clutch and transmission mechanism 22. The frame also supports a body 24 having a driver's compartment including the seat 26 and steering wheel 28.

The rear vehicle 30 includes a frame 32 supported upon laterally spaced pairs of driving wheels 34 engaging the driven wheel 36.

The adjacent ends of the vehicle frames 12 and 32 are coupled together for relative pivotal movement on a vertical axis and relative rotational displacement on a horizontal longitudinal axis. In the embodiment illustrated, the coupling means comprises an elongated hollow bearing member 40 secured ot the frame 32 of the rear vehicle, preferably on the longitudinal center line of the latter, and extends forward thereof toward the forward vehicle frame 12. A sleeve member 42 is mounted rotatably on the bearing member and is secured thereon against longitudinal displacement. This is achieved by confining the sleeve member between the annular ring 44 welded or otherwise secured to the bearing member and the ring 46 removably secured to the forward end of the bearing member by such means as interengaging threads.

Spacer members 48 extend radially outward from the sleeve member, in diametrically opposite directions, and mount the tongue members 50 which extend forward therefrom. Cooperating tongue members 52 extend rearwardly from the frame 12 of the forward vehicle and each is arranged to lap a projecting portion of a different one of the first mentioned tongue members 50. Thus, one tongue member projecting from each vehicle forms a cooperating pair. The lapping portions of these pairs of tongue members are provided with axially aligned openings which receive the pivot pins 54. The pivot pins thus provide a vertical axis about which the vehicle frame may pivot relative to each other, to effect steering of the tandem assembly.

Figure 3:
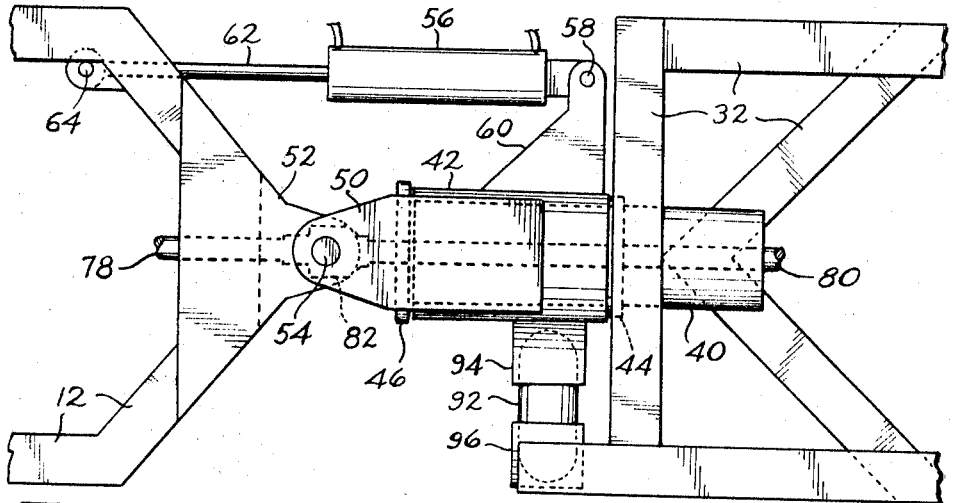
FIG. 3 is a fragmentary plan view of the frames of a tandem type vehicle showing a torque limit control embodying the features of this invention.
Figure 4:
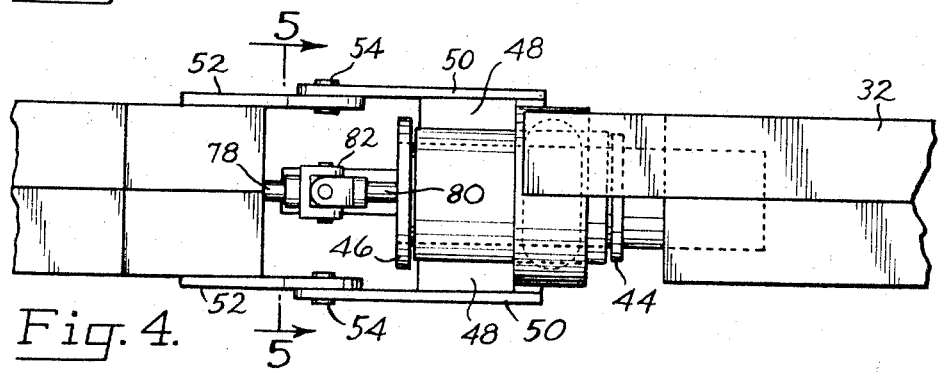
FIG. 4 is a fragmentary side elevation as viewed from the bottom in FIG. 3.

Steering of the tandem assembly is achieved by means of an extensible fluid pressure piston-cylinder unit. One end of the cylinder 56 is connected through the universal joint 58 to a laterally projecting ear 60 on the sleeve member 42. The end of the piston rod 62 projecting from the opposite end of the cylinder is connected through the universal joint 64 to the frame 12 of the front vehicle. Fluid pressure lines communicating with opposite ends of the cylinder are connected to a source of fluid pressure (not shown) through a control valve operated by the steering wheel 28. Thus, as the steering wheel is rotated clockwise (FIG. 2), fluid pressure is caused to enter the forward end of the cylinder (FIG. 3) and to exhaust from the rearward end of the cylinder, thereby retracting the piston rod. The front and rear vehicles thus are caused to pivot about the axis of the pivot pins 54 in the direction to effect a right hand turn. It will be apparent that counterclockwise turning of the steering wheel will effect extension of the piston rod from the cylinder and a corresponding turn to the left.

The arrangement of the hollow bearing member 40 and sleeve member 42 affords means by which to connect the wheels 14 and 34 of both vehicles to a common source of power, to provide simultaneous driving traction to the wheels of both vehicles. In the embodiment illustrated, a drive rod section 70 extends forwardly from the transmission mechanism 22 and is coupled through the universal joint 72 to the drive rod section 74 which is operatively connected through a differential 76 to the laterally spaced driven wheels 16 of the forward vehicle. A drive rod section 78 also projects rearwardly from the transmission mechanism and is connected to a drive rod section 80 through the universal joint 82 which is aligned coaxially with the pivot pins 54. The drive rod section 80 is connected through the universal joint 84 to the rearward drive rod section 86 which is operatively connected through the differential 88 to the laterally spaced driven wheels 36 of the rear vehicle.

It will be appreciated that the substantially concentric arrangement of the drive rod section 80 and the hollow bearing member 40, and the coaxial arrangement of the universal joint 82 and pivot pins 54, affords effective operation of the drive rod assembly without in any way restricting relative pivotal movement of the vehicles on the vertical axis of the pivot pins 54 and the relative rotational displacement of the vehicles on their longitudinal axis.

In accordance with the present invention means is provided for limiting the degree of rotational displacement of one vehicle relative to the other in their longitudinal direction, to minimize lateral tilting of the vehicle frame, while yet affording such lateral tilt, as the vehicle travels over uneven ground. In the embodiment illustrated this torque limit control comprises a wheel 90 mounting a pneumatic tire 92 which is confined freely between a pair of hollow housings 94 and 96 spaced apart in the transverse direction of the vehicle frames and disposed laterally from the sleeve member 42. The housings have open ends facing each other, whereby the tire is disposed in the transverse direction of the vehicle frames. One of the housings 94 is secured to the sleeve member 42 and the other housing 96 is secured to the vehicle frame 32 supporting the bearing member 40.

Figure 5:
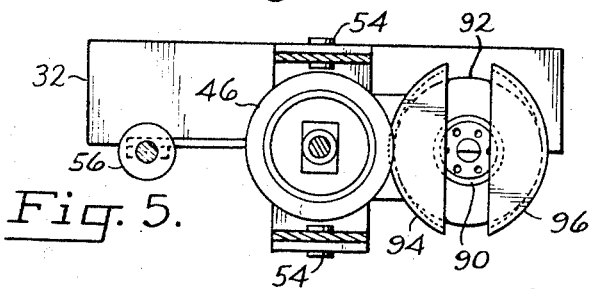
FIG. 5 is a sectional view taken on the line 5—5 in FIG. 4 and showing the relative positions of components of the torque limit control with the vehicle frames disposed in the same plane.
Figure 6:
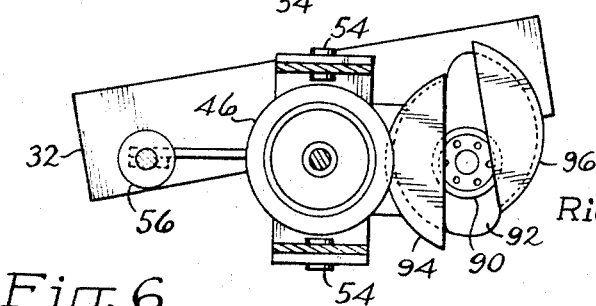
FIG. 6 is a sectional view similar to FIG. 5 but showing the relative disposition of components of the torque limit control with the vehicle frames rotated on their longitudinal axis to different planes.

Referring to FIGS. 5 and 6 of the drawings it will be seen that as the forward vehicle 10 tilts laterally, for example rotating counterclockwise about the longitudinal axis of the bearing member 40, the housing 96 secured to the frame 32 of the rear vehicle also tends to rotate counterclockwise (FIG. 6). This tendency to rotate is resisted resiliently by the pneumatic tire 92. The degree of such resistance is adjustable within limits by the degree of pressurization of the tire: the greater the pressure the greater the resistance.

Having now described my invention and the manner in which it may be used, I claim:

1. In a tandem type vehicle having a pair of vehicle frames, wheels supporting each frame, and coupling means interconnecting one end of each frame for relative rotational displacement of the vehicles on their longitudinal axis, torque limiting means for limiting said rotational displacement, comprising:
   (a) a pair of hollow housings spaced apart in the transverse direction of the vehicle frames laterally from the coupling means and having open ends facing each other,
   (b) the housings being supported for movement one with each vehicle frame, and
   (c) a pneumatic tire supported in and interengaging the pair of housings.

2. The torque limiting means of claim 1 wherein the vehicle coupling means includes a hollow bearing member secured to one vehicle frame and extending longitudinally thereof toward the other vehicle frame, a sleeve member mounted rotatably on the bearing member and secured thereon against longitudinal displacement, a pair of tongue members secured one to the sleeve member and the other to the other vehicle, and pivot means interconnecting the tongue members for relative movement on a vertical axis, and wherein one of the hollow housings is mounted on the sleeve member and the other hollow housing is mounted on the frame supporting the bearing member.

3. In a tandem type vehicle having a pair of vehicle frames and wheels supporting each frame, the combination therewith of:
   (a) coupling means interconnecting one end of each frame for relative pivotal movement on a vertical axis and relative rotational displacement on a longitudinal axis, the coupling means comprising:
      (1) a hollow bearing member secured to one vehicle frame and extending longitudinally thereof toward the other vehicle frame,
      (2) a sleeve member mounted rotatably on the bearing member and secured thereon against longitudinal displacement,
      (3) a pair of tongue members secured one to the sleeve member and the other to the other vehicle, and
      (4) pivot means interconnecting the tongue members for relative movement on a vertical axis,
   (b) and torque limiting means for limiting said relative rotational displacement, comprising:
      (1) a pair of hollow housings spaced apart in the transverse direction of the vehicle frames laterally from the coupling means and having open ends facing each other,
      (2) one of the housings being mounted on the sleeve member and the other being mounted on the frame supporting the bearing member, and
      (3) a pneumatic tire supported in and interengaging the pair of housings.

References Cited

UNITED STATES PATENTS

| 2,400,522 | 5/1946 | Lantz | 280—492 |
| 3,360,067 | 12/1967 | Scott | 180—51 |

LEO FRIAGLIA, *Primary Examiner.*

J. A. PEKAR, *Assistant Examiner.*

U.S. Cl. X.R.

280—111; 180—51, 79.2